Nov. 11, 1952 C. C. CUTLER 2,617,885

FREQUENCY CHANGING REGENERATIVE PULSE REPEATER

Filed July 11, 1950

INVENTOR
C.C. CUTLER
BY Geo. C. Ford
ATTORNEY

Patented Nov. 11, 1952 2,617,885

UNITED STATES PATENT OFFICE 2,617,885

FREQUENCY CHANGING REGENERATIVE PULSE REPEATER

Cassius C. Cutler, Gillette, N. J., assignor to Bell Telephone Laboratories, Incorporated, New York, N. Y., a corporation of New York Application July 11, 1950, Serial No. 173,203

11 Claims. (Cl. 178—70)

Figure 1:
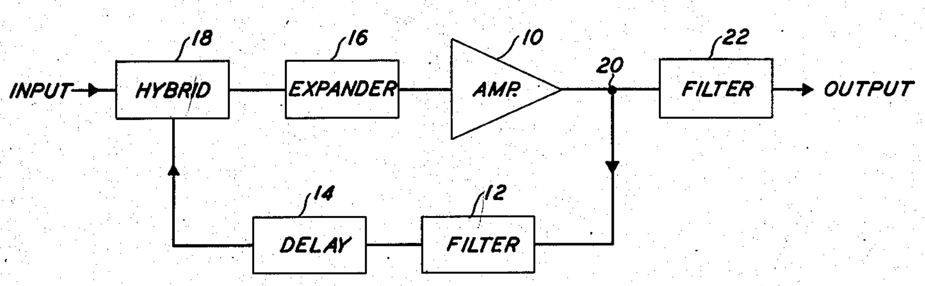

This invention relates to repeaters for communication circuits and more particularly to regenerative frequency changing repeaters for pulse modulation systems.

Communication by pulse modulation involves the use of periodic pulses that are modulated to convey information regarding samples of the message wave. Thus the amplitude or length of each individual pulse may be varied to convey information regarding a respective sample. Alternatively, a group of pulses may be used for each sample in which case the number of pulses or their character and arrangement may be employed to convey the information in accordance with a suitable code. Such communication systems have various advantages including ease of multiplexing, improvement in the signal-to-noise ratio, and more efficient operation of the apparatus. Particularly, when it is desired to take advantage of the multiplexing feature, it is necessary to employ a large number of pulses per unit time, making it necessary to employ relatively short pulses. In systems in which the pulses are to be transmitted over a radio or other carrier system, each transmitted pulse may be considered as a spectrum of individual continuous wave signals which may be expressed by Fourier analysis to give the pulse envelope. The term "center frequency," used hereinafter, indicates the mean frequency of such Fourier spectrum which may or may not be the same as the frequency of any component wave.

In any practical system, the pulse array will suffer certain degradation in transmission and consequently it is necessary in order to prevent confusion between adjacent pulses to employ some type of pulse regenerative repeater at intervals in the system corresponding to some or all of the points where repeaters are used for other reasons.

In the use of microwave radio as the means of transmission, the limitations of line-of-sight transmission in particular and also the limitations of available power require frequent repeaters intermediate the terminals. In such systems it is also necessary in order to avoid interference or crosstalk between the received and the retransmitted signals to change the center frequency of the pulses at each repeater station.

Accordingly, it is an object of the invention to provide frequency changing pulse repeaters which comprise a relatively small number of circuits and which are operative to reshape the pulses and to provide for the required change in carrier frequency in the same operation.

In accordance with the above object, the repeater of the invention includes a circulating pulse generator of the type comprising a broad band amplifier furnished with automatic gain control and having a feedback network which includes an expander, a frequency determinative device, and means for introducing a delay around the feedback loop equal to or aproximating the pulse interval of the pulse signals to be repeated. The frequency determinative elements of the circulating pulse generator are adjusted to permit circulation therein of pulses of center frequency $f$ which is different from the center frequency F for the incoming signal pulses. The latter pulses are injected in the circulating pulse circuit in such a way as to reach the expander or some other non-linear element in that circuit. Intermodulation of the two center frequencies, F of the incoming signal pulses and $f$ of the circulating pulses, occurs in such non-linear element with the result that modulation products are present at this point in the circulating pulse circuit. The desired modulation product chosen as suitable for transmission over the next link of the communication system is selected from those present in the circulating pulse circuit by means of a band-pass filter connected in a suitable output circuit.

Figure 2:
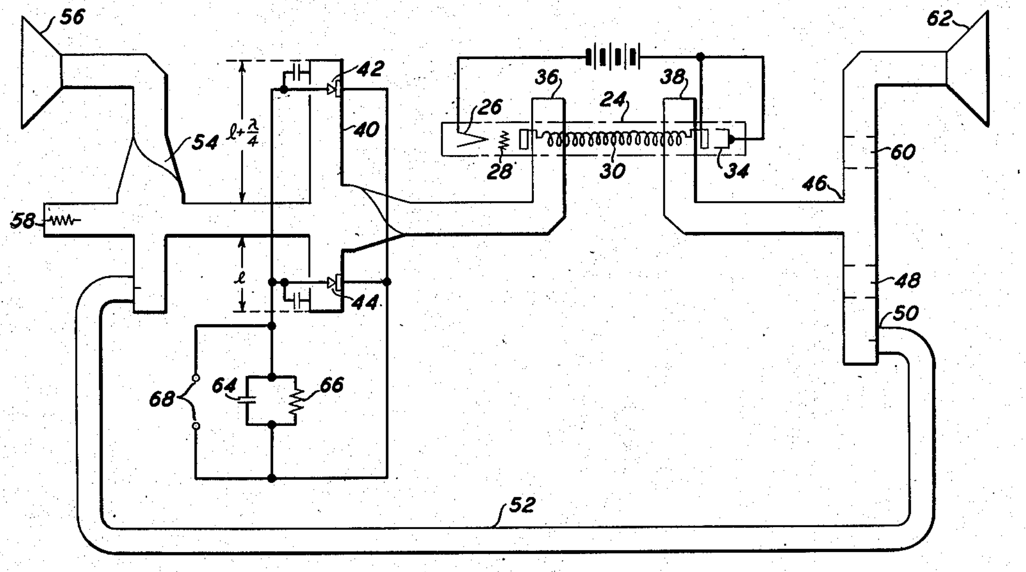

The above and other features of the invention will be described in detail in the following specification taken in connection with the drawings, in which:

Fig. 1 is a block schematic diagram of a typical regenerative frequency changing repeater in accordance with the invention; and Fig. 2 is a diagram partially in schematic form of a repeater according to the invention for use at microwave frequencies.

The principal features of the repeater of the invention may be described in connection with the block diagram of Fig. 1. The basic element of the repeater is the circulating pulse generator which comprises an amplifier 10 furnished with automatic gain control and having a feedback network which includes a frequency determinative element, as for example a filter 12, a delay element 14, and an exapnder 16. This circuit, which forms the subject-matter of my copending application Serial No. 118,889, filed September 30, 1949, may be caused to operate in such a way as to generate and sustain circulating pulses. The frequency characteristics of the filter 12 may be those of a low-pass filter to cause circulation of so-called direct-current or base-band pulses or the characteristic of the filter may be that of a high-pass or band-pass filter in which case radio frequency pulses will circulate in the circuit. The latter type of system is the one employed in the present invention.

In considering the operation of the circuit as outlined in the copending application above referred to, let it be assumed that a pulse occurs at the input of expander 16. This pulse may be applied from an external source or it may be merely a thermal noise pulse occurring when operating potentials are first applied to the circuit. Such a pulse is sharpened through the action of the expander which provides greater amplification for pulses of large amplitudes than for those of small amplitudes and passes to the input of amplifier 10. Here the pulse is amplified and passes around the feedback network through the frequency restrictive circuit or filter 12 (which may be taken to represent the frequency characteristics of all the remaining elements in the loop circuit including the expander, the delay element and the amplifier). In such frequency restrictive circuit certain of the frequency components of the pulse are attenuated and the remaining components recombined to form an output pulse which is longer than the input pulse. This pulse then appears at the input of the expander to initiate a second cycle of operation. Since the action of the expander is in opposition to that of the frequency restrictive circuit the combined effect tends to stabilize the pulse length upon repeated traversals of the loop, long pulses being sharpened by the expander and relatively unaffected by the frequency restrictive elements, while sharp pulses are relatively unaffected by the expander and are relatively broadened by the frequency restrictive element. Since the circulating pulses are amplified on each traversal of the circuit, automatic gain control is provided to limit or stabilize the ultimate pulse amplitude.

This circulating pulse generator may be adjusted to sustain circulation of pulses occurring at a chosen repetition rate determined by the delay element 14 and having a desired center frequency as determined by the frequency characteristics of the loop circuit. In accordance with the invention, the circuit constants of such a circulating pulse generator are adjusted to produce pulses in phase with the incoming signal pulses and having a center frequency $f$ which differs from the center frequency F of the signal pulses. The signal pulses are injected into the loop circuit of the generator in such a way as to reach one of the non-linear elements therein. Conveniently, this may be accomplished through the use of a hybrid network 18 so connected in the loop circuit that the incoming pulses and the circulating pulses are applied to one pair of conjugate branches of the hybrid. One of the other pair of branches is suitably terminated and the fourth branch completes the feedback loop of the circulating pulse generator. As shown in Fig. 1 hybrid 18 is so positioned as to result in the application of the incoming pulses of center frequency F to the expander 16. It should be understood, however, that such incoming pulses may be applied to any non-linear element of the circuit. In such non-linear element intermodulation of the two center frequencies occurs in accordance with known principles and the output of the non-linear element includes modulation products at center frequencies of $F+f$, $F-f$, $2F+f$, $2F-f$, etc. All of these modulation products falling within the pass band of the amplifier will be amplified and will appear at point 20 of the circulating pulse circuit. One of the modulation products having a center frequency suitable for further transmission may be extracted at this point and this may conveniently be accomplished through the connection of an output circuit including a band-pass filter 22 to the output of the amplifier. This filter, which has a relatively narrow pass band centered upon the modulation product which it is desired to employ for further transmission, rejects the circulating pulse frequency as well as the frequencies of the other modulation products. Filter 12 of the circulating pulse circuit may also be chosen in such a way as to pass only the circulating pulse frequency and to reject all of the modulation products.

If the circulating pulses are generated at an amplitude fixed by the automatic gain control of amplifier 10 which is large as compared with the amplitude of the incoming signal pulses and occur in synchronous phase with the incoming signal pulses, the instantaneous amplitude of the output pulse having a center frequency which is a modulation product of the center frequencies of the two incoming pulses is determined principally by the amplitude of the signal input pulses. Between the circulating pulses or in the absence of an input signal pulse, there will be no modulation product and hence no pulses will appear at the output of filter 22. Thus the amplitude of the output pulse may be controlled by the amplitude of the input pulse while its length is limited by the length of the circulating pulses. This type of regenerative repeater may therefore be used not only for the regeneration of pulse code modulation signals where the only characteristic of importance is the presence or absence of signal pulses, but also as a repeater for pulse amplitude modulation signals wherein the significant characteristic which is varied for the transmission of intelligence is the instantaneous amplitude of the signal pulses. With such signals the repeater of the invention will operate to preserve the relative pulse amplitudes and at the same time to limit the pulse lengths, thereby to afford at least partial regeneration of the incoming signals.

Fig. 2 illustrates a pulse repeater suitable for use at microwave frequencies of the order of 4000 megacycles per second. In this circuit the amplifier of the circulating pulse generator may comprise a traveling wave tube 24 shown schematically as including a cathode 26, a control grid 28, a helix 30, a collector anode 34, and input and output transducers 36 and 38. Traveling wave amplifiers of this type are described in detail in articles in "Proceedings of the I. R. E." for February 1947 entitled "Traveling Wave Tubes" by J. R. Pierce and L. M. Field at page 108; "Theory of the Beam Type Traveling Wave Tube" by J. R. Pierce at page 111; and "The Traveling Wave Tube as an Amplifier at Microwaves" by R. Kompfner at page 124.

The expander may comprise a wave guide hybrid junction 40, two conjugate arms of which comprise input and output circuits and the remaining conjugate arms of which include crystal rectifiers 42 and 44, these latter arms being ¼ wavelength different in length as indicated in the drawing. This type of expander forms the subject-matter of my copending application Serial No. 118,890, filed September 30, 1949. As pointed out therein, if the crystals 42 and 44 are matched to the corresponding arms of the hybrid junction for low amplitude input signals, an expander characteristic will be obtained since input signals of progressively greater amplitude are more completely reflected as a result of the progressively increasing mismatch between the crystals and the arms in which they are mounted. The quarter wavelength difference in the lengths of the conjugate arms including the crystal rectifiers serves to return the energy reflected from these rectifiers in the proper phase for addition, thereby to increase the available output for a given input.

The output of amplifier 24 is connected to its input through a loop circuit including expander 40. The amplifier output abstracted through transducer 38 is applied through a section of wave guide to a T junction 46. One arm of the T junction includes a band-pass filter 48 of the type comprising a pair of suitably spaced irises and the energy traversing this filter is coupled through a wave guide-to-coaxial line transducer 50 to a coaxial delay line 52 which is arranged to introduce a delay of such magnitude that the total delay around the circulating pulse loop is just equal to the interpulse interval of the periodic signal pulses. The pulses traversing delay line 52 are applied to the input of expander 40 through a hybrid junction 54 which is connected in circuit in such a way that one pair of arms connects delay line 52 to the input of expander 40 to complete the loop circuit. Signal pulses from an antenna 56 are applied to the junction through the arm which is conjugate to the arm to which delay line 52 is connected. A suitable termination is provided in the arm 58 of the hybrid junction which is conjugate to the arm connected to the input of expander 40. Thus pulses from either the delay line or the antenna can reach the expander but will not reach or interfere with the other respective sources.

It will be understood that pulses circulate in the circulating pulse loop just described in the same manner as in the simple loop shown in the block diagram of Fig. 1. The pass-band of filter 48 may be chosen to give circulating pulses of any center frequency within the pass band of traveling wave amplifier 24. Assuming that the signal pulses and circulating pulses occur synchronously, pulses of center frequency representing the modulation products of the center frequencies of the circulating pulses and the signal pulses applied to expander 40 and falling within the pass band of amplifier 24 appear at the T junction 46. All of such pulses except those at the center frequency of the circulating pulse are rejected by filter 48. A filter 60 which may be of the double-iris type and similar to filter 48 is provided in the other arm of the T junction to which is connected an output circuit including an antenna 62. The pass band of filter 60 is chosen to accept a particular center frequency representing one of the modulation products present at the output of traveling wave amplifier 24 and pulses of this frequency are radiated in the next subsequent link of the communication system.

As in the circuit of Fig. 1, automatic gain control is required for the circulating pulse circuit. Conveniently, this may be obtained by modifying the action of the expander 40 rather than operating directly upon the action of amplifier 24. For this purpose a time constant circuit comprising a capacitor 64 and a resistor 66 connected in parallel is provided in the direct-current circuit of rectifiers 42 and 44 of the expander. As has been pointed out in my copending application Serial No. 118,890 referred to above, the expander action of the wave guide hybrid junction is produced by changes in the impedance match between the rectifiers 42 and 44 and the arms in which they are mounted. This is accomplished by changes in the impedance of the rectifiers with incident energy and comes about by virtue of the fact that self-rectification occurs in the circuit including the rectifiers and the resultant bias across each rectifier is accordingly varied with incident energy level. The time constant circuit limits the rate at which changes in this self-bias can occur and thus provides automatic gain control action.

In the above description of the circuit of the invention, it has been assumed that the pulses circulating in the circulating pulse generator occur in synchronous phase with the input signal pulses. This condition may be realized by externally synchronizing the circulating pulse circuit through the application of a suitable series of synchronizing pulses at terminals 68 of the expander thereby to modify the expander characteristic in such a way that pulses can pass therethrough only during the synchronizing pulses. Alternatively, the signal pulses from antenna 56 may be employed to perform the synchronizing function if the natural repetition rate of the circulating pulse circuit is substantially the same as that of the signal pulses. Under such circumstances, the signal pulses tend to change the gain of the expander as pointed out in my copending application Serial No. 118,889, referred to above. If the two pulses do not occur in synchronism, such change in gain tends to alter the time of occurrence of the peak of the summation wave with a resulting change in the repetition rate of the generator in the proper direction to bring the two series of pulses into synchronism.

While the repeater of the invention has been described specifically as a microwave circuit employing distributed circuit constants the invention is applicable in other frequency ranges employing circuit elements suitable to the chosen range. By way of example, however, the circuit of Fig. 2 might be operated to produce circulating pulses at a center frequency of 4500 megacycles. If then, the input signal pulses were at a center frequency of 4000 megacycles, the output pulses applied to the antenna 62 could, depending upon the constants of filter 60, be chosen at 3500 megacycles, 5000 megacycles, 500 megacycles or 8500 megacycles, as well as at other higher or lower frequencies, depending of course upon the general frequency range desired for use in the next subsequent link of the system.

What is claimed is:

1. A frequency-changing regenerative repeater for periodic pulse signals of center frequency F comprising a circulating pulse generator having a loop circuit which includes a non-linear element and is capable of sustaining circulating pulses of center frequency $f$, means for applying said pulse signals to said non-linear element in synchronism with said circulating pulses, and means for extracting from said loop circuit only those pulses having a center frequency corresponding to one of the modulation products of said center frequencies F and $f$.

2. A frequency-changing regenerative repeater for periodic pulse signals of center frequency F comprising a circulating pulse generator having a loop circuit which includes a non-linear element and is capable of sustaining circulating pulses of center frequency $f$ and a repetition rate related to that of said periodic pulse signals, means for applying said pulse signals and said circulating pulses simultaneously to said non-linear element, and means for extracting from said loop circuit only those pulses having a center frequency corresponding to one of the modulation products of said center frequencies F and $f$.

3. A frequency-changing regenerative repeater for periodic pulse signals of center frequency F comprising a circulating pulse generator having a loop circuit which includes an expander, said generator being capable of sustaining circulation of pulses of center frequency *f*, means for applying said pulse signals to said expander, means for synchronizing said circulating pulses with said signal pulses for simultaneous occurrence in said expander, and means for extracting from said loop circuit pulses having a center frequency corresponding to an algebraic sum of said center frequencies F and *f*.

4. A frequency-changing regenerative repeater for pulse signals of center frequency F occurring at a fixed repetition rate comprising a circulating pulse generator having a loop circuit including a non-linear element, said generator being capable of sustaining the circulation of pulses of a center frequency *f* and at a repetition rate equal to that of said pulse signals, means for adjusting the phase of the circulating pulses to occur in synchronous phase with said signal pulses, and an output circuit connected to said loop circuit and passing only those pulses having a center frequency corresponding to one of the modulation products of said center frequencies F and *f*.

5. A frequency-changing regenerative repeater for periodic pulse signals of center frequency F comprising a circulating pulse generator having a loop circuit which includes a non-linear element, said generator being capable of sustaining circulating pulses of center frequency *f*, means for limiting the amplitude of the pulses circulating in said generator at a level which is high with respect to the amplitude of said signal pulses, means for applying said signal pulses to said non-linear element in synchronism with said circulating pulses, and an output circuit connected to said loop circuit and arranged to accept only those pulses having a center frequency which corresponds to a chosen one of the modulation products of the center frequencies F and *f*.

6. A frequency-changing regenerative repeater for periodic pulse signals of center frequency F having a range of amplitudes corresponding to amplitude pulses of said pulses, said repeater comprising a circulating pulse generator capable of sustaining the circulation of pulses of center frequency *f*, said generator including a loop circuit which includes a non-linear element and an amplifier having automatic gain control to limit the amplitudes of the circulating pulses to a value which is large with respect to said range of signal pulse amplitudes, means for applying said signal pulses to said non-linear element in synchronism with said circulating pulses, and means for extracting from said loop circuit only those pulses having center frequencies corresponding to one of the modulation products of said center frequencies F and *f*.

7. A frequency-changing regenerative repeater for pulse signals of center frequency F comprising a circulating pulse generator including an amplifier with automatic gain control and a feedback circuit for said amplifier including an expander, means for introducing a delay equal to the pulse interval of said pulse signals and a frequency determinative device the characteristic of which permits circulation of pulses of center frequency *f*, means for applying said pulse signals to said expander, and an output circuit arranged to pass the algebraic sum of said center frequencies F and *f*.

8. A frequency-changing regenerative repeater for periodic pulse signal of center frequency F comprising a circulating pulse generator including an amplifier with automatic gain control and a feedback circuit for said amplifier which includes an expander, a delay element introducing a delay equal to the pulse interval of said pulse signals and a filter the frequency characteristic of which permits circulation of pulses of center frequency *f*, means for applying said pulse signals to said expander in synchronism with said circulating pulses, and an output circuit connected to said feedback circuit and arranged to pass only those pulses having a center frequency corresponding to a chosen one of the modulation products of said center frequencies F and *f*.

9. A frequency-changing regenerative repeater for periodic pulse signals of center frequency F comprising a circulating pulse generator having a loop circuit which includes a non-linear element, said circuit being capable of sustaining the circulation of pulses of center frequency *f*, means for applying said pulse signals to said generator comprising a hybrid transformer connected in said loop circuit with an input for said pulse signals and a circuit for pulses returning to the generator through said loop circuit connected to two conjugate branches of said transformer and said generator connected to another branch thereof, means for synchronizing said circulating pulses with said signal pulses, and means for obtaining an output from said circulating pulse generator accepting only those pulses having center frequencies corresponding to one of the modulation products of said center frequencies F and *f*.

10. A frequency-changing regenerative repeater for periodic pulse signals of center frequency F comprising a circulating pulse generator including an amplifier and a feedback loop which includes a non-linear element, said generator being capable of sustaining circulating pulses of center frequency *f*, means for applying said signal pulses to said non-linear element in synchronism with said circulating pulses, an output circuit for said amplifier, and a band-pass filter in said output circuit having a pass band centered upon a frequency which is one of the modulation products of said center frequencies F and *f*.

11. A frequency-changing regenerative repeater for periodic signals of center frequency F comprising a circulating pulse generator having a loop circuit which includes a non-linear element, said generator being capable of sustaining circulating pulses of center frequency *f*, means for applying said pulse signals to said non-linear element in synchronism with said circulating pulses, an output circuit for said generator including a filter having a pass band centered upon a frequency which is one of the modulation products of said center frequencies F and *f*, and a filter in said loop circuit arranged to pass only pulses of said center frequency F and to reject pulses of center frequency corresponding to the modulation products of said center frequencies F and *f*.

CASSIUS C. CUTLER.

REFERENCES CITED

The following references are of record in the file of this patent:

UNITED STATES PATENTS

| Number | Name | Date |
|---|---|---|
| 2,412,995 | Levy | Dec. 24, 1946 |